US010732066B2

(12) United States Patent
Kruse et al.

(10) Patent No.: US 10,732,066 B2
(45) Date of Patent: Aug. 4, 2020

(54) COMPONENT DEVICE AND METHOD FOR DETECTING DAMAGE IN A BONDING ADHESIVE OF THE COMPONENT DEVICE

(71) Applicants: Airbus Defence and Space GmbH, Taufkirchen (DE); Airbus Operations GmbH, Hamburg (DE)

(72) Inventors: Thomas Kruse, Hamburg (DE); Thomas Körwien, Höhenkirchen (DE); Alois Friedberger, Oberpframmern (DE); Andreas Helwig, München (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 684 days.

(21) Appl. No.: 15/386,277

(22) Filed: Dec. 21, 2016

(65) Prior Publication Data

US 2017/0176281 A1  Jun. 22, 2017

(30) Foreign Application Priority Data

Dec. 22, 2015 (DE) .................... 10 2015 122 592

(51) Int. Cl.
*G01M 3/20* (2006.01)
*B29C 65/82* (2006.01)
(Continued)

(52) U.S. Cl.
CPC ............... *G01M 3/20* (2013.01); *B29C 65/48* (2013.01); *B29C 65/82* (2013.01);
(Continued)

(58) Field of Classification Search
CPC .......... G01M 3/00; G01M 3/20; G01M 3/227; B64F 5/60; B29C 65/82; B29C 66/1122; B29C 65/48
See application file for complete search history.

(56) References Cited

U.S. PATENT DOCUMENTS 3,591,944 A * 7/1971 Wilcox ................. G01M 3/229
53/131.2
5,499,529 A 3/1996 Kronberg et al.
(Continued)

FOREIGN PATENT DOCUMENTS

| DE | 1934798 A1 | 6/1971 |
| EP | 2431156 A1 | 3/2012 |
| JP | H0524116 A | 2/1993 |
| WO | 2012141779 A1 | 10/2012 |

OTHER PUBLICATIONS

European Patent Office, European Search Report for European Patent Application No. 16204871.4 dated May 19, 2017.
(Continued)

*Primary Examiner* — Eric S. McCall
*Assistant Examiner* — Timothy P Graves
(74) *Attorney, Agent, or Firm* — Jenkins, Wilson, Taylor & Hunt, P.A.

(57) ABSTRACT

The disclosure relates to a component device, in particular for a primary supporting component of an aircraft, which comprises a first component element, a second component element, a bonding providing a connection between the first component element and the second component element, a marker substance device configured to dispense a volatile marker gas to the environment when in contact with the surrounding air and being hermetically sealed from the surrounding air by the first component element, the second component element, and/or the bonding if the bonding is not damaged, and a detector device configured to detect the marker gas dispensed by the marker substance device.

20 Claims, 3 Drawing Sheets

(51) Int. Cl.
  *B29C 65/00* (2006.01)
  *G01M 3/22* (2006.01)
  *B29C 65/48* (2006.01)
  *B64F 5/60* (2017.01)
  *B29C 65/52* (2006.01)
  *B29L 31/30* (2006.01)

(52) U.S. Cl.
  CPC ........ *B29C 66/1122* (2013.01); *B29C 66/474* (2013.01); *B29C 66/721* (2013.01); *B29C 66/7394* (2013.01); *B64F 5/60* (2017.01); *G01M 3/223* (2013.01); *B29C 65/52* (2013.01); *B29C 65/522* (2013.01); *B29C 65/526* (2013.01); *B29C 66/026* (2013.01); *B29C 66/71* (2013.01); *B29C 66/73753* (2013.01); *B29C 66/73754* (2013.01); *B29C 66/73755* (2013.01); *B29C 66/73756* (2013.01); *B29C 66/742* (2013.01); *B29L 2031/3076* (2013.01)

(56) References Cited

U.S. PATENT DOCUMENTS

| | | | | |
|---|---|---|---|---|
| 2004/0020268 | A1* | 2/2004 | Hotta | G01M 3/227 73/40.7 |
| 2006/0090546 | A1* | 5/2006 | McCoy | G01M 3/226 73/40.7 |
| 2012/0135527 | A1* | 5/2012 | Bangera | G08B 21/245 436/3 |
| 2016/0282265 | A1* | 9/2016 | Su | G01N 21/7746 |

OTHER PUBLICATIONS

German Patent and Trade Mark Office, German Office Action in German Patent Application No. 10 2015 122 592.1 dated Aug. 16, 2016.

* cited by examiner

COMPONENT DEVICE AND METHOD FOR DETECTING DAMAGE IN A BONDING ADHESIVE OF THE COMPONENT DEVICE

CROSS-REFERENCE TO RELATED APPLICATION

This application claims priority to German Patent Application No. 10 2015 122 592.1, filed Dec. 22, 2015, which is incorporated herein by reference in its entirety.

TECHNICAL FIELD

The disclosure relates to a component device, in particular for a primary supporting component of an aircraft which comprises a first component element, a second component element, and a bonding which provides a connection between the first component element and the second component element. The disclosure further relates to a method for detecting a damage of a bonding of a component device.

BACKGROUND

Adhesive bindings for composite components are presently not certified for being used as exclusive joining element in primary supporting components of an aircraft. The main reason for that is that the adhesive bonding greatly depends on manufacturing parameters like impurity or surface preparation. All these influencing parameters may result in a weakened bonding or in debindering of the adhesive bonding. As to avoid this, preventing propagation of cracks is presently attempted. Alternatively, it is attempted to prevent cracks from growing.

As secondary adhesive bindings shall be used in composite components for primary supporting components, it is favorable that possible damages (debindering) can be found by persons without any specific knowledge within few flight cycles or during regular maintenance work. So far, providing sensors in the various connections is necessary for any monitoring of the state of structures (structural health monitoring). This results in complicated architectures, so that the advantages of composite connections, namely their light weight, cost-effectiveness, and durability are reduced.

For example, EP 2 431 156 A1 discloses using magnetostrictive parts in the connection to be monitored, wherein strains in the magnetostrictive parts caused by damages in the connection can be detected by an external sensor.

WO 2012/141779 A1 discloses a connection in which a fabric and an electric network with sensors are included which serve for monitoring the state of the connection.

SUMMARY

There may be a need to provide a simplified state monitoring for adhesive connections.

An aspect relates to a component device, in particular for a primary supporting component of an aircraft, which component device comprises a first component element, a second component element, and a bonding. The bonding provides a connection between the first component element and the second component element. Furthermore, the component device comprises a marker substance device (or: marker substance arrangement) which is configured to dispense a volatile marker gas to the environment or surroundings when being in contact with the surrounding air, and which marker substance device is hermetically sealed from the surrounding air by the bonding, the first component element, and/or the second component element if the bonding is not damaged. Moreover, a detector device is assigned to the component device, which detector device is configured to detect the marker gas dispensed by the marker substance device.

The component device may be a bonded composite of components or component elements. In addition to the first component element and the second component element, the component device may comprise additional component elements which are connected with each other by a second, third, or by an additional bonding. Preferably, each one of the bonding of the component device is provided with a marker substance device.

Preferably, the first component element comprises a first contact surface, while the second component element particularly comprises a second contact surface. Preferably, the bonding is provided between the first contact surface and the second contact surface. Preferably, the bonding establishes a (secondary) adhesive connection between the components. The adhesion may also be referred to as bonding and comprises the materials known from the prior art. In particular, the bonding is fluidically connected to (is in fluid communication with) the surrounding air at one of its outer surfaces, preferably a lateral surface. The surrounding air is preferably in direct contact with the bonding.

For example, the second component element may be a part of the outer skin of an aircraft. The first component element may be a stringer (purlin) of an aircraft. For example, the first component element is an angle profile for additional and locally limited stiffening of the second component element, as for example fuselage panel tongues. Preferably, the second component element is plate-shaped. A secondary adhesive connection may be provided by the bonding between the first component element and the second component element, in particular between the first contact surface and the second contact surface.

The following material combinations may be provided for the first component element and for the second component element: a cured composite component with another cured composite component; a cured composite component with an uncured composite component (with or without additional bonding, wherein the bonding is achieved by curing the up to now uncured composite component); a cured composite component with a metallic component; a cured composite component with a fiber metal laminate component; a cured composite component with a partially cured composite component (with or without additional bonding); a partially cured composite component with another partially cured composite component (with or without additional bonding); and any material combination in which at least one component comprises a resin, preferably a cyanate ester resin.

For applying the bonding, the first component and the second component, in particular the first contact surface and the second contact surface are preferably pretreated according to one of the following principles: global application of a chemical etching bath; local application by spraying; local application by vacuum application; local application onto the carrier material (including protection against contamination during transport); local application during a coating process by a brush; and any other defined standard application method for fluids.

For pretreatment, the first and/or second contact surface preferably undergo laser treatment and/or plasma treatment.

The bonding of the first component and the second component may be accomplished manually or in an automated process. The activation of the surface treatment is preferably stable for one year which gives the manufacturer the opportunity to provide manufacturing of bindings or tool concepts which enable a repeatable binding process without time constrictions or delay.

Preferably, the marker substance device is inserted in the component device at the same time and together with applying the bonding. In particular, inserting the marker substance device in the component device is accomplished such that the marker substance device is hermetically sealed from the surrounding air if the bonding is intact. Preferably, the marker substance device comes into contact with the surrounding air during propagation of a crack in the bonding or during debindering of the bonding. In this case, the marker substance device dispenses (emits) the marker gas to the surrounding air as the marker gas is volatile. As a consequence, the concentration of the marker gas in the surrounding air increases. In particular, the surrounding air is that gas or that combination of gases which surround the component device. For example, the room air in an aircraft is the surrounding air.

The hermetic separation of the marker substance device from the surrounding air is especially accomplished in that the separation is gas-tight so that no gas from the surrounding air can advance to the marker substance device. For this purpose, the marker substance device is completely surrounded by the bonding, for example, which bonding is particularly made of a gas-tight material. Alternatively, the marker substance device may be provided between the bonding and the first component element, between the bonding and the second component element, between the bonding, the first component element as well as the second component element, or between the first component element and the second component element. In particular, the material of the first component element and the material of the second component element is likewise gas-tight so that the marker substance device can be surrounded in a gas-tight manner by the bonding, the first component, or the second component.

The detector device may be provided at the first component element and/or at the second component element. However, it is also possible that the detector device is arranged spaced apart from the first component element and the second component element. For example, the detector device is mounted in a room in which the first component element and the second component element are provided.

In particular, the detector device is connected to a control arrangement which is adapted to evaluate the results detected by the detector device. For example, the control arrangement comprises a microprocessor or is connected to a computer system, in particular of the aircraft. Preferably, the control arrangement is adapted to output a message or an alarm if the detector device detects that the marker gas dispensed by the marker substance device is above a certain concentration.

The marker gas may be gas which does not occur in the surrounding air so that detection of this gas by the detector device indicates a damage in the bonding. Alternatively or additionally, the marker gas may be a gas which occurs in the surrounding air, like, for example, oxygen, nitrogen, or argon. An increased gas concentration in the surrounding air indicates a damage in the bonding. In particular, the marker gas is volatile so that it spreads or distributes in the environment surrounding the component device as soon as it is freed or dispensed by the marker substance device. For example, the marker gas may meet the requirements of the regulation (EC) Nr. 1907/206 (REACH-regulation), however, is not limited thereto.

An advantage of the aspect is that only one detector or few detectors of the detector device need to be provided as to monitor (observe) multiple connections. For example, only one detector of the detector device is provided in a room which comprises multiple component devices. Moreover, the detector device need not be provided directly at the first component and/or at the second component as to monitor the state of the bonding. Thus, provision of the detector device does not influence the weight or the shape of the first component element and of the second component element. In particular, the marker substance device is negligible in terms of the weight and/or the strength of the bonding.

It is preferred that the marker substance device comprises at least one vesicle which is filled with the marker gas and/or with a fluid or liquid of condensed marker gas.

Preferably, a multitude of vesicles is inserted in the bonding. In particular, the vesicle is of a round shape and is of a size in the range of $\mu m$ or mm. The vesicle is filled with the marker gas and/or with a fluid of condensed marker gas so that the marker gas is enclosed or trapped in the vesicle. This facilitates inserting the marker gas in the bonding as the vesicle, in particular a multitude of vesicles, are mixed with the uncured bonding and are applied to the first component and to the second component. The marker gas may comprise anisole (methylphenylether) or trace substances of ventilation systems.

In particular, the mix of vesicles and uncured bonding is arranged in a central region of the component so that the vesicles are arranged spaced apart from an edge or border of the bonding which comes into contact with the surrounding air. In particular, a region of the bonding of the component device which region is in contact with the surrounding air is not provided with vesicles. For example, the vesicle is arranged at a position of the bonding which is exposed to only small strains in case of applying loads to the component device and, thereby, the deforming is reduced at the first component element, the second component element, and the bonding.

Preferably, a multitude of vesicles is inserted into the bonding. The vesicles may have a wall which is permeable for the marker gas so that the marker gas is dispensed to the surrounding air if the vesicles come into contact with the surrounding air.

It is preferred that the marker substance device comprises at least one vesicle which is filled with a reaction gas and/or with a fluid of condensed reaction gas, wherein the reaction gas reacts chemically when being in contact with the surrounding air, in particular with oxygen, and generates the marker gas. The reaction gas may comprise propyl alcohol or an aldehyde.

In another embodiment, the vesicle is filled with a reactor gas or with a condensate of the reactor gas. For these vesicle, the considerations above do likewise apply. The reactor gas reacts with the surrounding air, in particular with the oxygen contained therein, and generates the marker gas.

It is preferred that the vesicle comprises a wall (envelope, shell) which can be destroyed when coming into contact with the surrounding air and/or by applying a force.

The wall may be made of a material which degenerates when being in contact with the surrounding air, in particular with oxygen, so that the marker gas is dispensed or freed. Additionally, the wall of the vesicle may be gas-tight for the marker gas in the undestroyed state, which facilitates producing and mixing the vesicles with the not yet cured bonding.

Alternatively, the wall of the vesicle is made of a material which can be easily destroyed, so that the vesicle is destroyed in case of damages at or in the bonding. Additionally, the wall of the vesicle may be designed such that there is a strong interconnection with the bonding so that cracks or displacements in the bonding reliably result in destroying at the vesicle.

In particular, the wall of the vesicle encloses or surrounds the content of the vesicle, i.e., the gaseous or condensed marker gas and/or reaction gas.

It is preferred that the marker substance device comprises marker material which is hermetically sealed from the surrounding air by the bonding, the first component element, and/or the second component element.

In this embodiment, which may be used alternatively or additionally to the vesicles, the marker material is not enclosed or trapped by an additional component, as for example the vesicle, but directly by the bonding, the first component element, and/or the second component element. For example, the marker material is provided in the middle of the first contact surface and the second contact surface so that a lateral margin of the marker material would be exposed to the surrounding air without the bonding. The lateral margin is closed by the bonding so that the bonding together with the first component element and the second component element surround and enclose the marker material.

For this purpose, the bonding, the first component element, and the second component element are made of a gas-tight material. Alternatively, the first contact surface and/or the second contact surface may be coated with a gas-tight layer.

As a result of a damage in the bonding, for example, a crack, a gas connection between the marker material and the surrounding air is created thereby allowing the marker gas to escape or dispense through the damage.

An advantage of the marker material is that it may be placed exactly at the intended location in the bonding. For example, the marker material is arranged at a position of the bonding which is exposed only to low strains when applying a load to the component device, whereby the deformation at the first component element, the second component element, and the bonding is also reduced.

It is preferred that the marker material comprises the marker gas, a fluid of condensed marker gas, a solid reaction material which reacts chemically when being in contact with the surrounding air and generates the marker gas, a reaction fluid which reacts chemically when being in contact with the surrounding air and generates the marker gas, and/or a reaction gas which reacts chemically when being in contact with the surrounding air and generates the marker gas.

Basically, it is possible to use various materials and states of materials as the marker material, as long as it is possible to enclose or trap the marker material in a gas-tight manner. For example, a hollow space or cavity may be provided for this purpose, which hollow space is filled with the marker material later on and before the access is closed. However, it is preferred to apply the marker material at the same time and together with the bonding.

With regard to the materials which react chemically when being in contact with the surrounding air and thus generate the marker gas, the considerations and advantages elucidated above apply in an analogue manner. The reaction gas, the reaction fluid, and the solid reaction material may be aggregated and combined as to be a first reaction material. The marker material may comprise propyl alcohol or an aldehyde.

It is preferred that the bonding is in contact with the surrounding air via an outer surface, wherein a reagent material is provided along the outer surface, wherein the marker material and/or the vesicle comprises a second reaction material which releases an intermediate gas when being in contact with the surrounding air, which intermediate gas reacts chemically with the reagent material and generates the marker gas.

Preferably, the reagent material is provided entirely along the outer surface. However, it is also possible that the reagent material is provided in sections along the outer surface. In particular, the reagent material is spaced apart from the outer surface so that surrounding air may attain the outer surface. However, preferably the distance between the outer surface and the reagent material is low, so that intermediate gas dispensing from the bonding comes into contact with the reagent material.

The second reaction material reacts when being in contact with the surrounding air, in particular with oxygen, to the intermediate gas which chemically reacts with the reagent material and dispenses the marker gas thereby. Preferably, the intermediate gas and the reagent gas are chosen such that the volume of the generated marker gas as a result of the reaction of intermediate gas with reagent material is larger than the volume of the intermediate gas. In this manner, especially much marker gas may be generated so that even small damages or cracks in the bonding can be detected, from which damages or cracks only few intermediate gas can dispense.

It is preferred that the detector device comprises at least two gas detectors, each of which is adapted to detect the marker gas, wherein, preferably, each of the gas detectors is adapted to measure a direction of movement of the surrounding air.

Providing two or more gas detectors provides the opportunity to determine the position of the damage in the bonding. Depending on the chronological order in which the marker gas is detected by the gas detectors or depending on the concentration of the marker gas being different at the respective gas detectors, conclusions may be drawn to the position of the damage in the bonding.

The gas detector may be an electric nose or a semiconductor sensor. The gas detectors may be of different or same type.

In a preferred embodiment, the gas detectors are further adapted to measure the direction of movement of the surrounding air. This may improve the localization of a damage in the bonding, especially in connection with providing multiple gas detectors which have this characteristic. For this purpose, the gas detectors may be arranged measure the velocity of the gas passing the gas detectors.

It is preferred that the detector device comprises a fluid detector which is adapted to detect the condensed marker gas.

If the component device is positioned in rooms which are very cold or the walls of which are very cold, there exists the possibility that the marker gas condenses. This applies especially if the marker gas has a condensation point which is close to or just above or below the temperature of the room. Due to the condensation, the concentration of the marker gas increases so that even very small concentrations of the marker gas can be measured in the air. This applies especially if the marker gas is released or dispensed to a small amount only and if the condensation of the marker gas results in an accumulation of the concentration of the marker gas in terms of time.

This fluid detector may be arranged, for example, below or under a collection arrangement as, for example, a funnel, so that as much condensed marker gas as possible reaches the fluid detector. The fluid detector may be provided, for example, at a cold wall or at a cooled position of the first and/or second component element.

According to a further embodiment, the fluid detector may be integrated in existing draining elements of the aircraft.

Another aspect relates to an aircraft which comprises the component device described above.

The aircraft may be any vehicle which is enabled to spend a certain amount of time in the air.

Further, another aspect relates to a method for detecting a damage of a bonding of a component device, in particular for a primary supporting component of an aircraft. The method comprises the steps of hermetically sealing a marker substance device from the surrounding air by the bonding, a first component element of the component device, and/or a second component element of the component device, wherein the marker substance device dispenses or releases a volatile marker gas to the surroundings when being in contact with the surrounding air. Furthermore, the method comprises the steps of detecting the marker gas in the surrounding air, and determining a damage if the concentration of the marker gas in the surrounding air is above or exceeds a predetermined threshold value.

With regard to this method, the considerations, improvements, preferred embodiments, and advantages presented in the context of the component device are similarly applicable. In particular, the method is executed with the component device presented above.

Hermetic sealing of the marker substance device is done especially during manufacturing of the component device, and there preferably when providing the bonding between the first component element and the second component element.

A damage in the bonding is determined if the concentration of the marker gas in the surrounding air is above a certain threshold value. If the marker gas does not exist in the surrounding air, this threshold value may be at a concentration of 0% or slightly above. In case the marker gas is part of the surrounding air, a damage may be concluded if this concentration increases relatively by 5%, 10%, 15%, or more. Determining the damage may be accomplished by the control arrangement described above.

It is preferred that the concentration of the marker gas is detected in a time-dependent manner at multiple positions by multiple gas detectors, wherein the position of the damage in the bonding is determined based on the timely order of the increasing concentration of the marker gas at the gas detectors.

It is preferred that different marker gases are used for different component devices.

However, it is also possible that different marker gases are used for different bindings of one component device. This means that different marker gases are provided for the marker substance device. Especially in combination with multiple gas detectors which are adapted for detecting different marker gases, respectively, this provides the advantage that different bindings may be monitored at the same time and, thereby, these bindings may be determined on the basis of the marker gas.

It is preferred that the component device is positioned in a room, wherein presence of the marker gas is detected at a position at which an exchange of air occurs between the room and its outer environment.

For example, the room may be a cabin or a cargo area or the aircraft. Alternatively, the room may be the interior of an aircraft. In another embodiment, the gas detector may be included in ventilation elements of the aircraft, for example in its fuselage, which may be a hybrid ventilation detection element. Arranging a gas detector at a position where an exchange of surrounding air between the room and the surroundings of the room, for example that one of an aircraft, occurs, results in the air containing the marker gas flowing past this gas detector. In this manner, it can be easily achieved that a large room can be monitored with one gas detector, as the likelihood that the gas detector is arranged such that the marker gas does not reach the gas detector is minimized.

BRIEF DESCRIPTION OF THE DRAWINGS

Now, preferred embodiments are elucidated with reference to the attached schematic drawings which are not true to scale. It is shown in.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
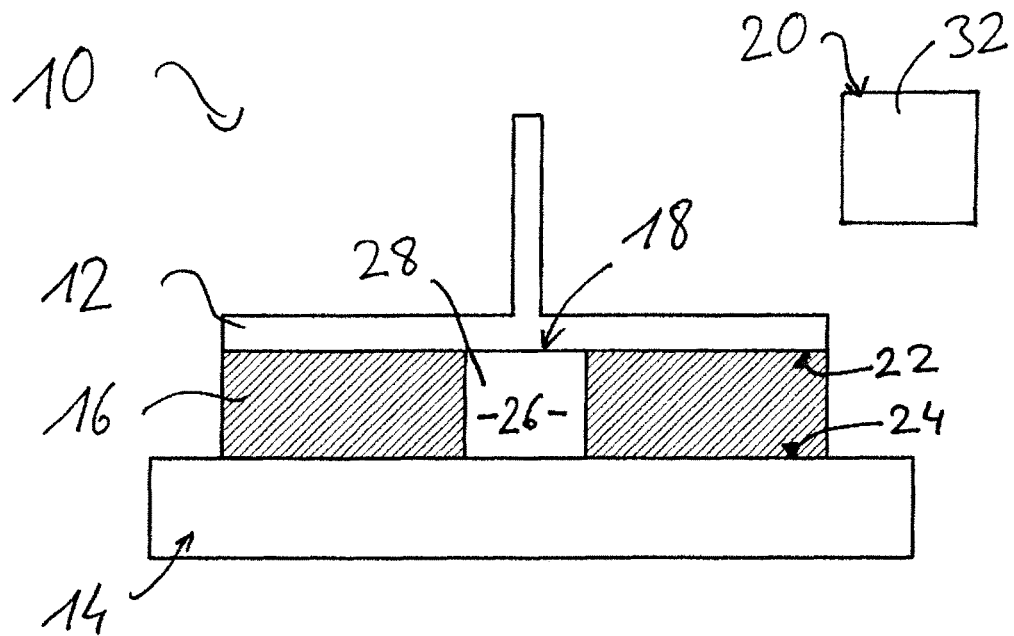
FIG. 1 is a cross section through component device according to a first embodiment without a damage in the bonding.

FIG. 1 shows a component device 10 which comprises a first component element 12, a second component element 14, a bonding 16, a marker substance device 18, and a detector device 20. The component device 10 forms a primary supporting component of an aircraft.

The first component element 12 is designed as a stringer or purlin while the second component element 14 is a section of an outer skin of an aircraft. The first component element 12 and the second component element 14 are connected with each other by an adhesive bonding 16, which is shown in the figures in a magnified manner. The bonding 16 is provided between a first contact surface 22 of the first component element 12 and a second contact surface 24 of the second component element 14 and interconnects these two contact surfaces 22 and 24.

A hollow space 26 is provided in the bonding 16, which hollow space or cavity is hermetically sealed (gas-tight) from the surroundings of the component device 10 by the bonding 16, the first component element 12, and the second component element 14. A marker material 28 of the marker substance device 18 is provided in this hollow space 26. In the shown embodiment, the marker material 28 is a solid material which reacts chemically when being in contact with the surrounding air, in particular with its oxygen, so that the marker gas 30 is generated. However, the marker material 28 may also be the marker gas 30, the condensed marker gas 30, as well as a reaction fluid which reacts chemically with the surrounding air such that it generates the marker gas 30, or a reaction gas which reacts chemically with the surrounding air such that it generates the marker gas 30.

In the depicted embodiment, the detector device 20 comprises a gas detector 32 which is arranged spaced apart from the first component element 12, the second component element 14, and the bonding 16. The gas detector 32 may determine the concentration of the marker gas 30 in the surrounding air and is provided as a semiconductor detector. The gas detector 32 may be incorporated in ventilation elements of the aircraft, for example in its fuselage, which may represent a hybrid ventilation detection element.

The detector device 20 is connected in a wireless manner with a control arrangement that is not shown in the drawings, which control arrangement evaluates the measurement results of the detector device 20. In this exemplary embodiment, the control arrangement is a computer system of the aircraft. The control arrangement provides a notification or an alarm if it concludes from a change in concentration of the marker gas 30 that a damage exists in the bonding 16, as will be shown in the following.

Figure 2:
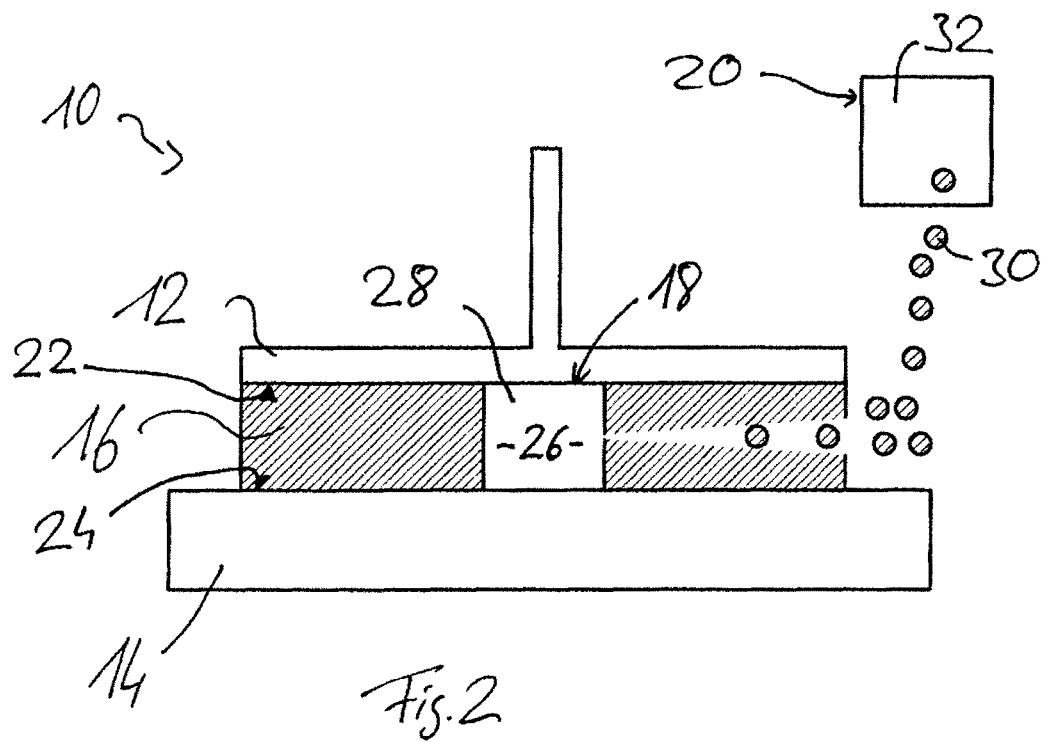
FIG. 2 is a cross section through the component device of FIG. 1 with a damage in the bonding.

In case of a damage in the bonding 16, which is shown in FIG. 2 by a crack, the marker material 28 reacts with the surrounding air and dispenses marker gas 30. The concentration of the marker gas 30 is measured by means of the gas detector 32. In case the concentration of the marker gas 30 in the surrounding air exceeds a certain threshold value, it is concluded that a damage exists in the bonding 16. In the depicted embodiment, the marker gas 30 is a gas which does not occur in the surrounding air, so that a damage in the bonding 16 may be concluded if the gas detector 32 detects presence of the marker gas 30 in the surrounding air; hence, the predetermined threshold value for the concentration of the marker gas 30 in the surrounding air is 0%.

Figure 3:
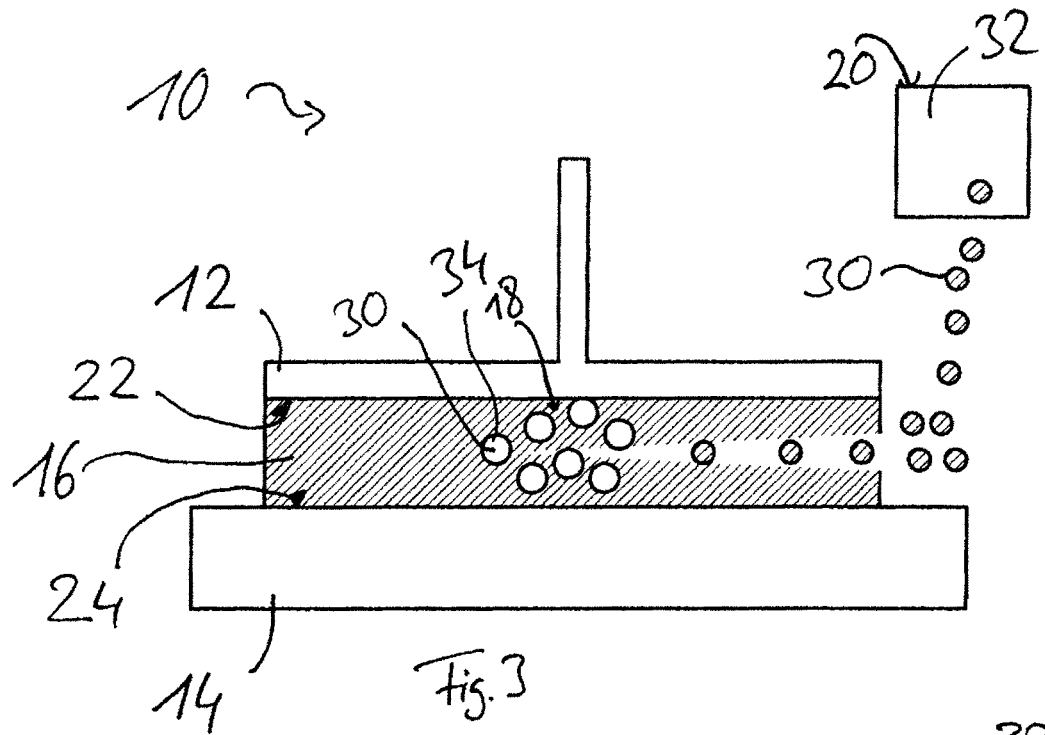
FIG. 3 is a cross section through component device according to a second embodiment.

FIG. 3 shows another embodiment of the component device 10. The component device 10 according to FIG. 3 corresponds with the component device 10 according to FIG. 1, except for the following differences.

In the embodiment shown in FIG. 3, the marker substance device 18 comprises multiple vesicles 34 which are filled with the marker gas 30. The vesicles 34 comprise a wall which degenerates when being in contact with the oxygen of the surrounding air such that the marker gas 30 is released. In the shown embodiment, the vesicles 34 are completely surrounded by the bonding 16 and are arranged in the midst of the bonding 16, so that the vesicles 34 do not come into contact with the surrounding air if the bonding is not damaged. In FIG. 3, a damage in the bonding 16 is shown in the form of a crack, so that the vesicles 34 come into contact with the surrounding air, the vesicles 34 are destroyed or damaged, and the marker gas 30 is released. As elucidated above, the marker gas 30 is detected by the gas detector 32.

Figure 4:
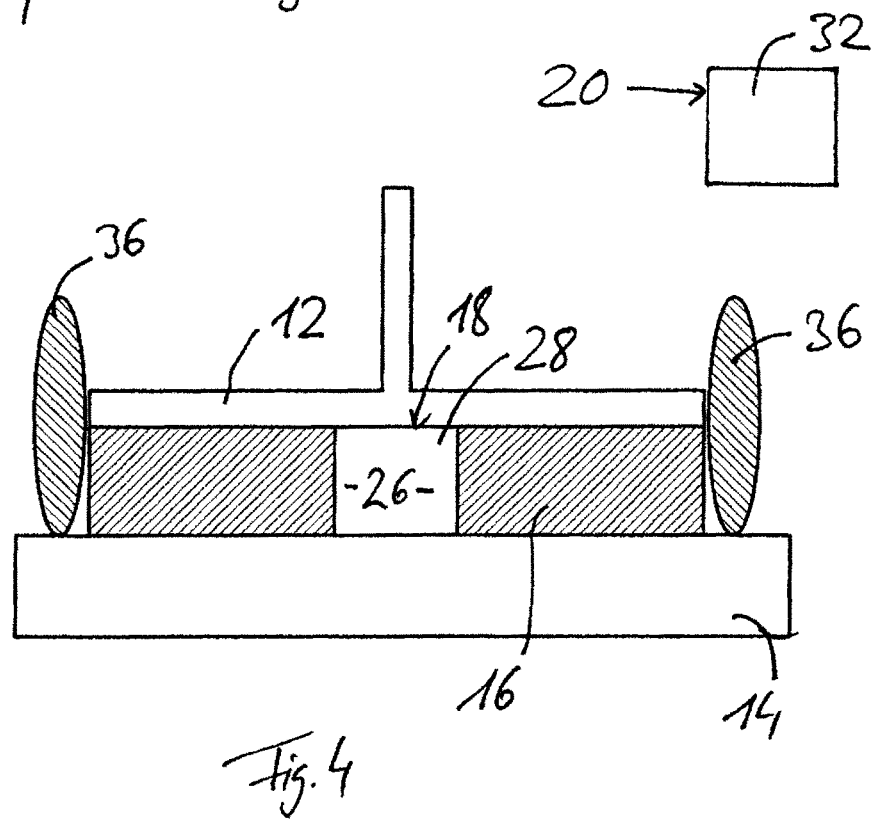
FIG. 4 is a cross section through component device according to a third embodiment.

FIG. 4 shows a third embodiment of the component device 10. The embodiment of the component device 10 depicted in FIG. 4 corresponds with the component device 10 according to FIG. 1, except for the following differences:

In the embodiment shown in FIG. 4, the marker material 28 reacts with the surrounding air not by generating the marker gas 30, but releases an intermediate gas. The intermediate gas chemically reacts with a reagent material 36 and, thus, generates the marker gas 30. The reagent material 36 is provided at an outer circumferential margin of the bonding 16, so that the intermediate gas flows past the reagent material 36 in case of a damage in the bonding 16, so that the intermediate gas can chemically react with the reagent material 36.

A further embodiment which is not shown in the drawings corresponds with the embodiment shown in FIG. 4, wherein no marker material 28 but vesicles 30 are provided as part of the marker substance device 18. The second reaction material which releases the intermediate gas when it comes into contact with the surrounding air is provided in the vesicles 30.

Figure 5:
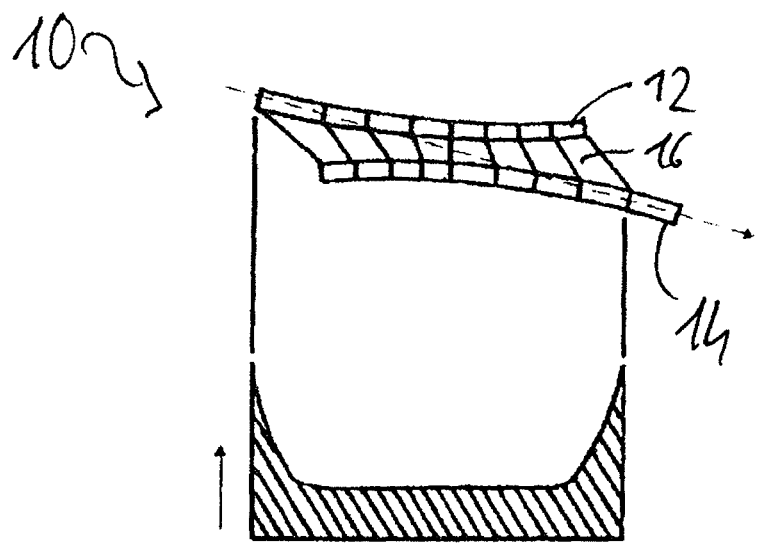
FIG. 5 is a cross section through a component device with an assigned load profile.

FIG. 5 shows schematically the component device 10 according to FIG. 3 in a loaded state, wherein the load is applied along the arrow. The load peaks are schematically shown below the component device 10. It can be seen that the load is less in the center of the bonding 16 in case of such a load. If the vesicles 34 are arranged at this position, these are not going to be destroyed even in case of a load being applied to the component device 10. Conversely, damage to the vesicles 34 indicates that there is a damage in the bonding 16. Hence, the center or midst of the connection is the preferred position for arrangement of the vesicles 34 and even of the marker material 28.

Figure 6:
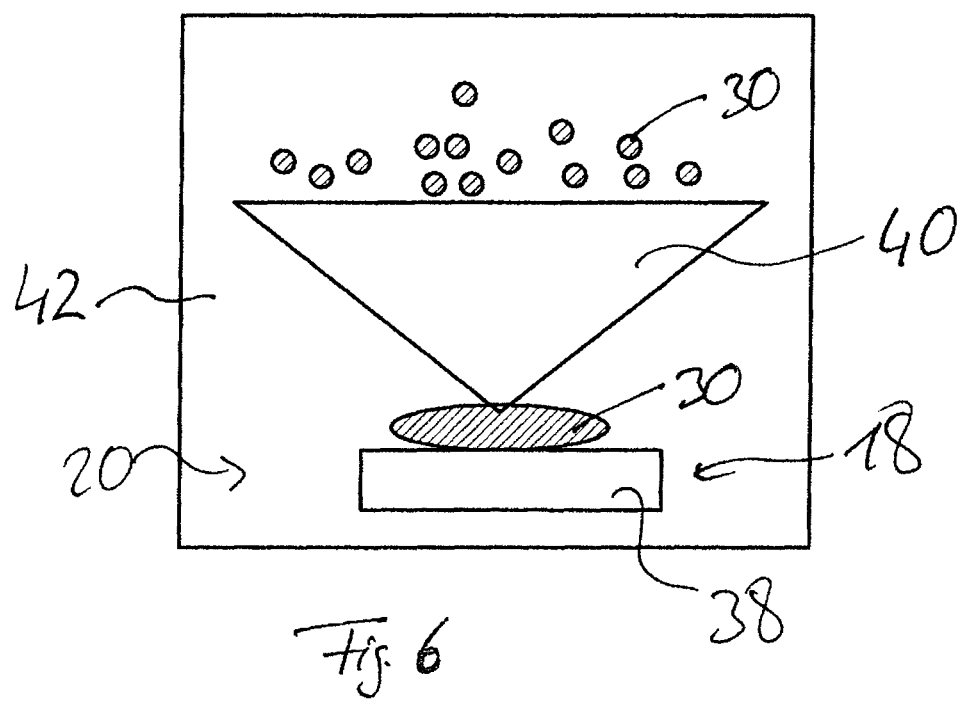
FIG. 6 is a top view onto a fluid sensor of the component device according to FIG. 1.

FIG. 6 shows a fluid detector 38 of the detector device 20. The fluid detector 38 is adapted to detect condensed marker gas 30. For this purpose, a funnel 40 is assigned to the fluid detector 38, which funnel collects the condensed marker gas 30 and guides it to the fluid detector 38. For example, the fluid detector 38 and the funnel 40 are mounted at a wall 42 of the aircraft, which wall is cooler than the surroundings, so that the amount of condensation of the marker gas 30 is increased there. By means of the fluid detector 38, even minor concentrations of the marker gas 30 may be determined, as a cumulation of the marker gas 30 takes place due to the condensation.

According to another embodiment, the fluid detector 38 may be integrated in existing draining elements of the aircraft.

The functioning of the component device 10 is described in the following.

The marker material 28 or the vesicles 34 are enclosed in the bonding 16 such that they are sealed from the surrounding air in a gas-tight manner. In case of a damage of the bonding 16, for example, due to a crack, a gas connection is created between the vesicles 34 or the marker material 28 and the surrounding air. In this manner, marker gas 30 is released, which may be detected by the gas detector 32 or by the fluid detector 38. In case the concentration of the marker gas 30 exceeds a certain threshold value, this indicates that a damage of the bonding 16 exists.

Localizing the damage of the bonding 16 takes place by providing multiple gas detectors 32. Depending on which gas detector 32 measures the marker gas 30 first or depending on where the concentration of the marker gas 30 in the surrounding air is highest, conclusions may be drawn to the position of the damage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

LIST OF REFERENCE NUMBERS 10 component device
12 first component element
14 second component element
16 bonding
18 marker substance device
20 detector device
22 first contact surface
24 second contact surface
26 hollow space
28 marker material
30 marker gas
32 gas detector
34 vesicle
36 reagent material
38 fluid detector
40 funnel
42 wall

What is claimed is:

1. A component device for a primary supporting component of an aircraft, comprising:
a first aircraft composite component element;
a second aircraft composite component element;
a bonding adhesive which provides a connection between the first aircraft composite component element and the second aircraft composite component element;
a marker substance device to dispense a volatile marker gas to the environment when being in contact with surrounding air, the marker substance device being hermetically sealed from the surrounding air by the bonding adhesive, the first aircraft composite component element, and/or the second aircraft composite component element when the bonding adhesive is not damaged; and
a detector device to detect the marker gas dispensed by the marker substance device.

2. The component device of claim 1, wherein:
a first portion of the bonding adhesive extends continuously from the first aircraft composite component element to the second aircraft composite component element;
a second portion of the bonding adhesive extends continuously from the first aircraft composite component element to the second aircraft composite component element;
a space is defined between the first portion of the bonding adhesive and the second portion of the bonding adhesive; and
the marker substance device is located in the space and is in direct contact with the first portion of the bonding adhesive and with the second portion of the bonding adhesive.

3. The component device of claim 1, wherein the marker substance device comprises at least one vesicle filled with an intermediate gas and/or a fluid of the intermediate gas in a condensed state, and wherein, when the marker substance device contacts the surrounding air, the intermediate gas reacts with the surrounding air to generate the marker gas.

4. The component device of claim 1, wherein the marker substance device comprises at least one vesicle which is filled with the marker gas and/or with a fluid of condensed marker gas, and wherein the vesicle comprises a wall which is destroyable when coming into contact with the surrounding air.

5. The component device of claim 1, wherein the marker substance device comprises marker material hermetically sealed from the surrounding air by the bonding adhesive, the first aircraft composite component element, and/or the second aircraft composite component element.

6. The component device of claim 5, wherein the marker material comprises the marker gas, a fluid of condensed marker gas, a solid reaction material which reacts chemically when being in contact with the surrounding air and generates the marker gas, and/or a reaction fluid which reacts chemically when being in contact with the surrounding air and generates the marker gas.

7. The component device of claim 1, wherein the detector device comprises a fluid detector which is adapted to detect the marker gas in the form of a condensed fluid.

8. The component device of claim 1 wherein the first aircraft composite component is a stringer of an aircraft and wherein the second aircraft composite component is a part of an outer skin of the aircraft.

9. A component device for a primary supporting component of an aircraft, comprising:
a first aircraft component element;
a second aircraft component element;
a bonding adhesive which provides a connection between the first aircraft component element and the second aircraft component element;
a marker substance device to dispense a volatile marker gas to the environment when being in contact with surrounding air, the marker substance device being hermetically sealed within the bonding adhesive when the bonding adhesive is not damaged; and
a detector device to detect the marker gas dispensed by the marker substance device.

10. The component device of claim 9, wherein the marker substance device comprises at least one vesicle filled with the marker gas or an intermediate gas, in a gaseous or condensed state.

11. A method for detecting a damage of a bonding adhesive for a component device of an aircraft, comprising the steps of:
adhering a first aircraft component element of the component device to a second aircraft component element of the component device with the bonding adhesive;
inserting a marker substance device into the bonding adhesive while not yet cured and hermetically sealing the marker substance device from the surrounding air, wherein the marker substance device dispenses a marker gas to the surroundings when being in contact with surrounding air;
detecting the marker gas in the surrounding air; and
determining a damage if the concentration of the marker gas in the surrounding air exceeds a predetermined threshold value.

12. The method of claim 11, wherein the concentration of the marker gas is detected in a time-dependent manner at multiple positions by multiple gas detectors, and wherein the position of the damage in the bonding adhesive is determined based on the timely order of how the concentration of the marker gas increases at the gas detectors.

13. The method of claim 11, wherein different marker gases are used for different component devices.

14. The method of claim 11, wherein inserting the marker substance device into the bonding adhesive the marker substance device comprises completely surrounding the marker substance device with the bonding adhesive.

15. The method of claim 11 further comprising filling a vesicle with the marker gas or with a fluid of the marker gas in a condensed state, wherein inserting the marker substance device into the bonding adhesive the marker substance device comprises inserting the vesicle into the bonding adhesive.

16. The method of claim 15, wherein the vesicle has a wall which is permeable for the marker gas, the method further comprising dispensing the marker gas through the wall to the surrounding air when the vesicle comes into contact with the surrounding air.

17. The method of claim 11, wherein inserting the marker substance device into the bonding adhesive the marker substance device comprises inserting a plurality of vesicles into the bonding adhesive.

18. The method of claim 17, wherein inserting the plurality of vesicles into the bonding adhesive comprises arranging a mix of the vesicles and uncured bonding adhesive in a central region of the component and away from an edge of the bonding adhesive in contact with the surrounding air.

19. The method of claim 11 further comprising cracking or debindering the bonding adhesive to form an opening in the bonding adhesive permitting the surrounding air to contact the marker substance device while preventing the surrounding air from passing through the first aircraft component element or through the second aircraft component element into contact with the marker substance device.

20. The method of claim 11 further comprising:
providing a reagent material at an outer circumferential margin of the bonding adhesive;
cracking or debindering the bonding adhesive to permit the surrounding air to contact the marker substance device, wherein the marker substance device dispenses the marker gas to the surroundings when being in contact with surrounding air by releasing an intermediate gas; and
reacting the intermediate gas with the reagent material to generate the marker gas.

* * * * *